United States Patent

[11] 3,633,640

| [72] | Inventor | Howard Moore<br>5719 Wallis Lane, Woodland Hills, Calif. 91364 |
|---|---|---|
| [21] | Appl. No. | 828,846 |
| [22] | Filed | May 29, 1969 |
| [45] | Patented | Jan. 11, 1972 |

[54] TOOL HAVING RETRACTABLE AND REMOVABLE CENTERING SLEEVE
10 Claims, 10 Drawing Figs.

[52] U.S. Cl. ................................................ 145/51
[51] Int. Cl. ........................................ B25b 15/00, B25b 23/08
[50] Field of Search ........................................... 145/50.5, 51, 52

[56] References Cited
UNITED STATES PATENTS
2,205,167  6/1940  Greterman ................. 145/52
2,796,100  6/1957  Dierker ..................... 145/52
3,068,922  12/1962  Hill ......................... 145/52
3,403,711  10/1968  Moore ...................... 145/51

*Primary Examiner*—Theron E. Condon
*Assistant Examiner*—Neil Abrams
*Attorney*—Fraser & Bogucki ABSTRACT: A tool having a working tip at the end of a shank is provided with a retractable and removable centering sleeve assembly. A hollow cylindrical sleeve which is slidably mounted on the shank is held in selected positions relative to the shank tip by the engagement of an ear upset from the shank with a cylindrical guide concentrically disposed within the sleeve. The sleeve is spring biased into an operative position by engaging the ear in a first groove in the guide and into a retracted position by positioning the ear at the one end of the guide. Engagement of the ear within a second groove in the guide permits complete removal of the sleeve from the shank.

PATENTED JAN 11 1972

INVENTOR.
HOWARD MOORE
BY *Fraser and Bogucki*
ATTORNEYS

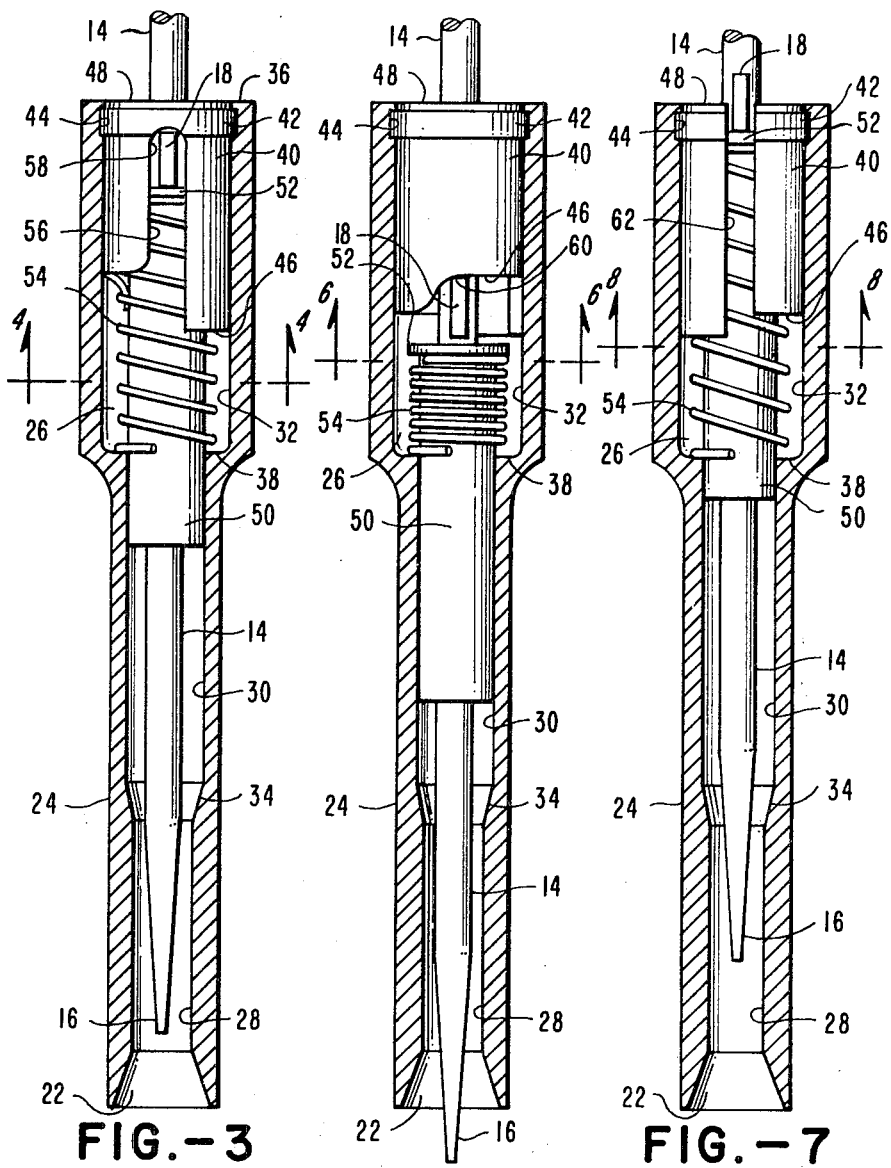

TOOL HAVING RETRACTABLE AND REMOVABLE CENTERING SLEEVE

BACKGROUND OF THE INVENTION

1. Field of the Invention

The present invention relates to tools having centering devices for enhancing the engagement of the working tip of the tool with generally circular objects to be manipulated by the tool, and more particularly to screwdrivers and related tools having centering sleeves which are adjustable relative to the tip thereof.

2. Description of the Prior Art

Many different devices have been proposed for aiding in the insertion and retention of the working tip of a tool such as a screwdriver blade within a slot in a generally circular piece of work such as the conventional screwhead. One type of device which has proven to be particularly successful is a hollow, generally cylindrically shaped centering sleeve which extends beyond the tip and blade of a screwdriver to surround part or all of the screwhead. The centering sleeve must normally be made at least partially retractable so as not to interfere with proper screw engagement if the screwhead is to be driven flush with a surface.

In most known arrangements centering sleeve assemblies are relatively complex and are added as a permanent part of the tool during its manufacture. Standard tools without such assemblies are not easily equipped with them, and duplicate sets of tools must be acquired if it is desired to have tools both with and without such assemblies.

Certain work applications such as in cases of limited access or where the tool is to be used for prying may dictate the removal of a centering sleeve assembly. Few tools have sleeve assemblies which are completely removable, a situation which again may require separate sets of tools if work versatility is to be realized.

One tool which has a retractable and removable centering sleeve is disclosed in U.S. Pat. No. 3,403,711, issued to Howard Moore on Oct. 1, 1968. Such tool includes a hollow cylindrical sleeve which is slidably mounted on the tool shank and is held in selected positions relative to the tip of the shank by engagement of a sleeve mounted pin with a cylindrical, shank mounted guide. The result is a relatively simple centering sleeve assembly which is formed with the tool or added to an already existing tool as desired. The sleeve itself is easily placed in an operative position, retracted or removed, as desired, by simple twisting and pushing motions.

The manufacture of a tool having a centering sleeve assembly of the type disclosed in the previously referred to U.S. Pat. No. 3,403,711, however, involves certain limitations, particularly where an automated process is to be used. If the cylindrical sleeve guide is fabricated of metal, for example, the guide must be mounted on the tool shank with considerable care to prevent the end portions thereof from protruding outwardly and away from the shank. If the sleeve guide comprises plastic molded on the tool shank, the guide may be damaged due to heat or holding fixtures and impact loading when a plastic handle is later added to the shank, and vice versa. During assembly of the removable sleeve, the included spring and retainer must be depressed and held within the sleeve during insertion of the pin into the sleeve, thereby making the automated process more difficult and complex.

It would therefore be advantageous to provide a tool having a relatively simple centering sleeve assembly which is not only easily retracted and removed but readily lends itself to fabrication and mounting on the tool, particularly by an automated process.

SUMMARY OF THE INVENTION

In brief, the present invention provides a tool having a centering sleeve assembly which is easily assembled and added to the tool and which can be retracted from the working tip or completely removed from the tool as desired. A hollow, generally cylindrically shaped centering sleeve is slidably concentrically mounted on the shank of the tool. The sleeve is spring biased in a direction toward the working tip to hold the sleeve in a selected position when an ear extending from the shank is engaged with a cylindrical guide member concentrically disposed within the upper end of the sleeve. A first groove extends from the end of the cylindrical guide member adjacent the tip along a portion of the length of such guide, and engagement of the ear in the first groove holds the sleeve in its operative position. The ear may also be engaged with a ridged portion at the end of the cylindrical guide to hold the centering sleeve in a retracted position. Engagement of the ear in a second groove which extends along the entire length of the cylindrical guide between opposite ends enables the centering sleeve assembly to be completely removed from the tool.

In accordance with further aspects of the invention a standard tool is easily equipped with the centering sleeve assembly simply by forming or otherwise providing an outwardly protruding ear on the tool shank. The ear is preferably upset from the shank by an appropriate process such as forging, for reasons of simplicity. Alternatively the ear may be added to the tool shank such as by brazing. Whichever technique is used the forming of the ear on the tool shank need not interfere with such things as a handle to be later added or threaten damage to a handle already affixed to the shank.

In accordance with still further aspects of the invention, the various components of the sleeve assembly are readily and simply assembled into an integral unit which is ready for use and in a manner which readily lends itself to automated manufacturing. The centering sleeve and cylindrical guide are preferably fabricated of resilient material such as plastic. With the spring in place within the sleeve and a retainer added to the inside of the spring as desired, the guide need only be concentrically positioned within the sleeve to complete the assembly. Seating of the guide at a proper axial location within the hollow sleeve may be accomplished by providing the outer surface of the guide and the inner wall of the sleeve with a raised portion or ring and mating groove respectively, the ring snapping into place within the mating groove by virtue of the resiliency of the guide and sleeve as the guide is axially advanced into the sleeve.

BRIEF DESCRIPTION OF THE DRAWING

The novel features of this invention, as well as the invention itself, both as to its organization and method of operation, may best be understood from a reading of the following description, taken in connection with the accompanying drawing, in which:

FIG. 3 is a broken away side view of the centering sleeve assembly and screwdriver shank of FIG. 2 with the sleeve in the operative position;

FIG. 4 is an end view of the arrangement of FIG. 3 taken along the section line 4—4;

FIG. 5 is a broken away side view of the centering sleeve assembly and screwdriver shank of FIG. 2 with the sleeve in a retracted position;

FIG. 6 is an end view of the arrangement of FIG. 5 taken along the section line 6—6;

FIG. 7 is a broken away side view of the centering sleeve assembly and screwdriver shank of FIG. 2 with the sleeve positioned for removal from the shank;

FIG. 8 is an end view of the arrangement of FIG. 7 taken along the section line 8—8;

DETAILED DESCRIPTION

Centering sleeve assemblies in accordance with the invention can be used with a wide variety of standard tools, both power and hand driven, which have a shank ending in a working tip. For example, the assemblies may be used with a handheld power tool which can perform a variety of different operations with different bits installed in the shank end. However, for the sake of simplicity a preferred embodiment of the invention is hereafter described in conjunction with a conventional screwdriver as shown in FIGS. 1 and 2.

Figure 1:
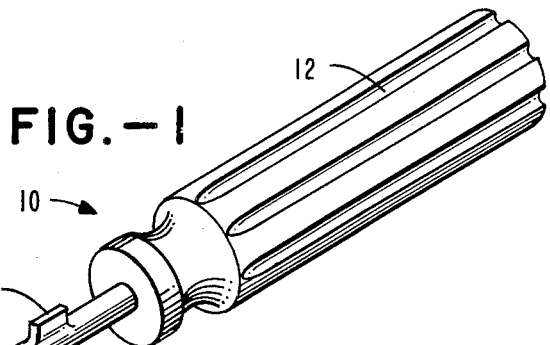
FIG. 1 is a perspective view of a conventional screwdriver having an outwardly extending ear on the shank thereof for cooperation with a retractable and removable centering sleeve assembly in accordance with the invention.

In FIG. 1 is illustrated a screwdriver 10 having a handle 12 and a shank 14 with a working tip comprising a blade 16 at the end of the shank 14 opposite the handle 12. The single blade 16 is shown for illustration only, and it should be understood that the embodiments hereafter described can be used with other types of screwdrivers, as for example a Phillips head screwdriver. An ear 18 extends outwardly from the shank 14 to engage a retractable and removable centering sleeve assembly 20 shown in FIG. 2 and described in detail hereafter.

For ease of fabrication the ear 18 is preferably upset such as by forging or other appropriate technique. Alternatively the ear 18 may be formed by brazing or otherwise fastening an element such as a small piece of metal of appropriate size and shape to the shank 14. In either event the ear 18 is readily formed on the shank of an already assembled tool to adapt it for use with the centering sleeve assembly, or formed during fabrication of the shank, the handle being added later, as desired.

Figure 2:
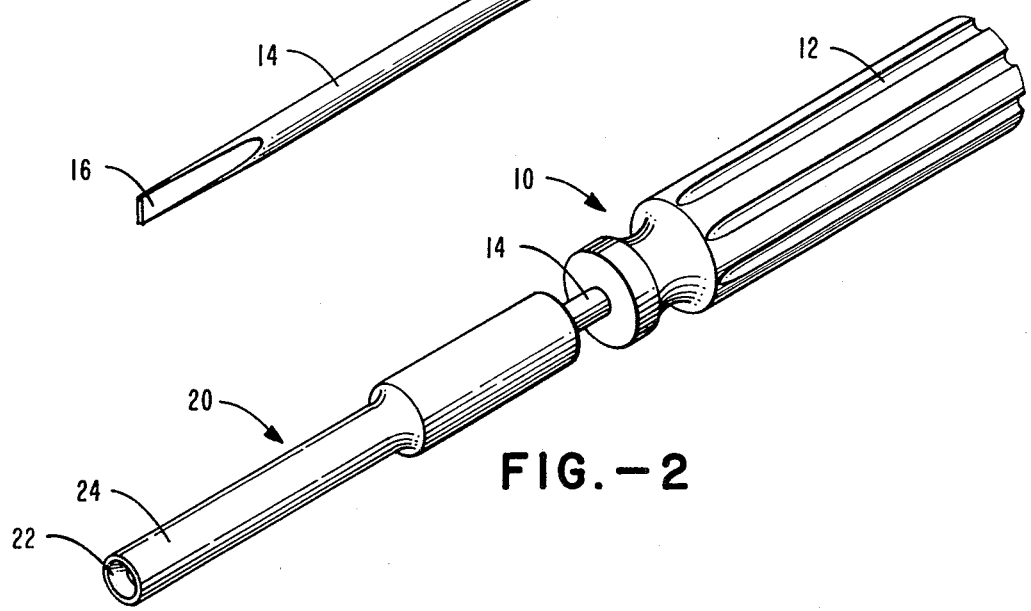
FIG. 2 is a perspective view of the conventional screwdriver of FIG. 1 with the centering sleeve assembly installed and in the operative position.

FIG. 2 shows the screwdriver 10 with the centering sleeve assembly 20 added. The assembly 20 is depicted in FIG. 2 and in FIGS. 3 and 4 in its operative position with the blade 16 of the screwdriver 10 recessed inwardly from the lower open end 22 of a hollow, cylindrically shaped centering sleeve 24. The centering sleeve assembly 20 is shown in its retracted position relative to the shank 14 in FIGS. 5 and 6 and in its removable position relative to the shank 14 in FIGS. 7 and 8. The handle 12 is not shown in FIGS. 3-8 for simplicity of illustration. FIGS. 3, 5 and 7 are broken away side views of the assembly 20 with the centering sleeve 24 being shown in section and all other components being shown in their entirety.

The centering sleeve 24 has a hollow interior 26, a first portion 28 of which has a diameter slightly larger than the diameter of the shank 14 and which extends from the lower open end 22 along a portion of the length of the sleeve 24. The hollow interior 26 also includes second and third portions 30 and 32, the second portion 30 being of slightly larger diameter than the first portion 28 and having a tapered section 34 forming a transition from the portion 28 to the portion 30. The third portion 32 is of considerably larger diameter than the second portion 30 and extends from the upper open end 36 of the sleeve 24 to form a second annular shoulder 38.

Figure 9:
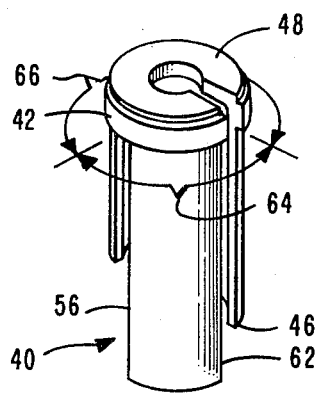
FIG. 9 is a perspective view of the guide shown in the arrangements of FIGS. 3, 5 and 7.

A hollow, generally cylindrical sleeve guide 40 is concentrically disposed or mounted within the centering sleeve 24 adjacent the upper open end 36. The guide 40 which is shown in detail in FIG. 9 may be mounted by any suitable means, but is preferably seated against the interior wall of the third portion 32 of the centering sleeve hollow interior 26 by a raised annular portion forming a ring 42. The ring 42 is received within an annular recess 44 in the interior wall of the sleeve 24 to properly locate the guide 40 relative to the sleeve 24 and prevent axial movement therebetween. The guide 40 has a lower end 46 adjacent the lower open end 22 of the centering sleeve 24 and an upper end 48 generally continuous with the upper open end 36 of the sleeve 24. The upper end 48 includes an annular, inwardly extending portion defining a circular aperture of diameter slightly larger than and accommodating the shank 14.

Figure 10:
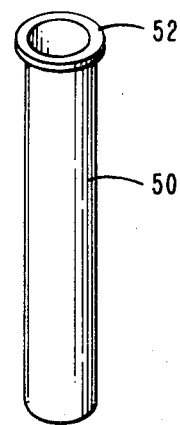
FIG. 10 is a perspective view of the cylindrical retainer shown in the arrangements of FIGS. 3, 5 and 7.

A hollow, generally cylindrically shaped retainer 50 which is shown in detail in FIG. 10 is slidably concentrically mounted between the inner wall of the hollow sleeve interior 26 and the shank 14. The outer diameter of the retainer 50 is slightly less than the diameter of the second portion 30 of the hollow interior 26 and is less than the inner diameter of the guide 40. The inner diameter of the retainer 50 is greater than the diameter of the shank 14, permitting the retainer 50 to slide along the shank and within the sleeve. The upper end of the retainer 50 includes a radially outwardly extending lip 52.

The retainer 50 is normally urged in a direction away from the annular shoulder 38 by a coil spring 54 concentrically disposed about the outside of the retainer 50 and extending between the shoulder 38 and the retainer lip 52, the latter being of larger diameter than the spring. The lip 52 also engages the ear 18 except when the sleeve assembly 20 is in the removable position shown in FIGS. 7 and 8, in which case the retainer 50 experiences its greatest upward movement relative to the shoulder 38 and the lip 52 resides against the inside surface of the upper end 48 of the guide 40.

That portion of the guide 40 which is engaged by the ear 18 determines the position of the centering sleeve 24. When the sleeve 24 is in its operative position as shown in FIGS. 3 and 4, the ear 18 is engaged with and resides within a first groove 56 which comprises a slot extending from the lower end 46 along a portion of the length of the guide 40 in a direction substantially parallel to the axis of elongation of the guide 40. The ear 18 is forced into engagement with the closed end 58 of the first groove 56 by the action of the coil spring 54 and retainer 50. The downward movement of the centering sleeve 24 is thus limited but the sleeve may be moved in an upward direction against the urging of the spring 54. When the lower open end 22 of the centering sleeve 24 is positioned over a screwhead, a downward force exerted on the screwdriver handle 12 overcomes the force of the coil spring 54 to slide the centering sleeve 24 upward relative to the shank 14 if necessary to permit engagement of the screwdriver blade 16 with the mating slot in the screwhead. As shown in FIGS. 2, 3, 5 and 7, the lower open end 22 of the centering sleeve is flared outwardly from the lower end of the hollow interior first portion 28. The flared lower open end 22 enhances engagement of and alignment of the centering sleeve 24 with the screwhead, and permits its use with screwheads of different diameters and various configurations including, but not limited to, flat, round and oval heads.

The centering sleeve 24 thus seeks a slot in the screwhead, which prevents the tip of the screwdriver from slipping out of the slot, and permits the operator to advance his grip on the screwdriver handle while the tip remains indexed to the screwhead in its slot. Only one hand of the operator is required for most work applications and the centering sleeve expedites screw insertion or removal in limited access areas and in areas which cannot be seen by the operator. In the event the screwdriver blade 16 is considerably smaller than the length of the slot in the screwhead, the centering sleeve with its flared open lower end maintains engagement of the blade within the slot despite considerable misalignment between the axes of the screw and the screwdriver, thereby permitting the use of a screwdriver which would be considered too small under ordinary circumstances.

Occasionally it may be necessary that the centering sleeve 24 be held in a retracted position away from the screwdriver blade 16. By way of example, retraction may be necessitated in a situation where the operator must be able to see the screwdriver tip and visually follow its insertion into a screwhead or other appropriate item. The centering sleeve 24 is shown in its retracted position in FIGS. 5 and 6. Located at the lower end 46 of the sleeve guide 40 and removed approximately 120° relative to the longitudinal axis of the guide from the first groove 56 is a ridged portion 60. The guide 40 contains a second groove 62 which comprises a slot extending between the lower and upper ends 46 and 48 of the guide in a direction substantially parallel to the axis of elongation of the guide. The second groove 62 is located relative to the axis of elongation from both the first groove 56 and the ridged portion 60. The first and second grooves 56 and 62 essentially divide the hollow cylindrical guide 40 into two segments 64 and 66 respectively comprising approximately one-third and two-thirds of the circumference of the guide. The segment 64 is longer than the segment 66 such that at the lower end 46 of the sleeve guide, the segment 64 extends further along the interior of the centering sleeve 24 than does the segment 66.

It should be understood that the first and second grooves 56 and 62 and the ridged portion 60 are illustrated as being approximately 120° removed from one another for purposes of illustration only. The groove and the ridged portion can be arranged in any desired order and spaced at any suitable angular position commensurate with relative ease of manufacture.

With the shank 14 pushed downwardly relative to the centering sleeve 24 as far as the spring 54 will allow, the ear 18 will clear the segment 66 but not the segment 64 at the lower end 46 of the sleeve guide 40. When the centering sleeve 24 is in its operative position, subsequent compression of the spring 54 removes the ear 18 from the first groove 56. At this point the centering sleeve 24 may be rotated in a counterclockwise direction (looking downwardly at the centering sleeve assembly 20 from the screwdriver handle 12) relative to the shank 14 and at the same time the pressure exerted by the operator may be released allowing the spring 54 to expand. The counterclockwise rotation of the centering sleeve 24 may be continued until the ear 18 engages the ridged portion 60 in the sleeve guide segment 66. The centering sleeve 24 will thus remain in the retracted position as shown in FIGS. 5 and 6. Should it be desired to again place the centering sleeve in the operative position shown in FIGS. 3 and 4, it is only necessary to rotate the sleeve 24 in a clockwise direction relative to the shank 14, the ear 18 sliding along the end of the segment 66 then engaging the first groove 56 and sliding to the closed end 58 thereof under the force of the spring 54.

In the event it is desired to remove the centering sleeve assembly 20 completely from the screwdriver where existing space limitations will only accommodate the screwdriver shank 14, or where the screwdriver is to be used for prying or other application which might damage the centering sleeve assembly, the operator holds the centering sleeve 24 with one hand and pushes downwardly on the screwdriver handle 12 to overcome the force of the coil spring 54. When enough force is applied to completely compress the coil spring, the ear 18 will clear the ridged portion 60 of the sleeve guide 40 as the sleeve is rotated in a counterclockwise direction relative to the screwdriver shank 14. This engages the ear 18 in the second groove 62 which extends along the entire length of the sleeve guide. As the coil spring 54 expands the ear 18 is allowed to slide along the second groove 62 and out of the sleeve guide 40. The spring 54 expands until the retainer lip 52 engages the inside surface of the upper end 48 of the sleeve guide 40 and the centering sleeve assembly is free to be completely removed from the screwdriver shank 14 as shown in FIGS. 7 and 8.

The centering sleeve assembly 20 which has been removed from the screwdriver may be again attached to the screwdriver by inserting the blade 16 through the upper end 48 of the sleeve guide 40 and along the inside of the retainer 50 until the ear 18 engages the retainer lip 52. The ear 18 is indexed in the upper end of the second groove 62 and the spring 54 is compressed sliding the ear 18 along the groove to a position adjacent the lower end 46 of the guide 40. The centering sleeve 24 is then rotated in a clockwise direction relative to the screwdriver shank 14 to place the sleeve in the retracted or operative positions as desired. The relative positions of the grooves 56 and 62 may be reversed if desired, in which event the sleeve 24 is rotated in a clockwise direction rather than a counterclockwise direction to effect removal.

The centering sleeve 24 and sleeve guide 40 may be fashioned from any appropriate material such as metal. A resilient material such as plastic is preferred however since it permits use of the ring 42 and annular recess 44 to position the guide 40 within the sleeve 24. Assembly of the various components is thereby facilitated and readily lends itself to an automated process in which the retainer 50 with spring 54 are inserted into the sleeve 24 as a first step and the guide 40 is snapped into place to complete the second and final step. Plastic as a material for the sleeve 24 and guide 40 is also advantageous in that it is easily molded into the desired shape and has a tendency not to score or otherwise damage objects which may be close to or in the path of the sleeve during use of the screwdriver.

Recently developed relatively hard and durable plastics have proven to be particularly well suited for use in fabricating the sleeve 24 and guide 40, such plastics including Delrin and Adiprene marketed by E. I. du Pont de Nemours and Company, Lexan marketed by General Electric Company and Pellethane marketed by Upjohn Company. In addition substantially transparent plasticlike materials such as acrylic and polystyrene are well suited for centering sleeve construction and enable the operator to view the internal working parts.

The retainer 50 may be eliminated from the centering sleeve assembly 20 if desired, in which event the ear 18 engages the upper end of the coil spring 54 instead of the retainer lip 52. Use of the retainer 50 is preferred however, in that it facilitates the proper positioning of the spring 54 and the working cooperation of the various components. In addition the retainer 50 facilitates installation of the centering sleeve assembly 20 on the screwdriver by guiding the shank 14 and blade 16 into the assembly and preventing the blade 16 from striking or otherwise interfering with the various coils of the spring 54. The retainer 50 is preferably made of plastic, but any suitable material may be used.

Although there has been described a specific arrangement of a removable and retractable centering sleeve assembly in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:
1. A tool comprising the combination of:
a shank having a working tip at one end thereof;
a hollow, generally cylindrical sleeve slidably concentrically mounted on the shank and having an annular shoulder at the inner wall thereof;
a hollow, generally cylindrical guide concentrically mounted within a portion of the sleeve and having one end thereof generally continuous with the end of the sleeve opposite the working tip, an annular inwardly extending portion at said end defining a generally circular aperture, a first slot therein extending from the end thereof opposite said one end thereof along a portion thereof, a second slot therein extending between the opposite ends thereof, and a ridged shoulder portion at the end thereof opposite said one end thereof;
means extending outwardly from he shank; and
a coil spring slidably concentrically mounted on the shank and extending between the annular shoulder of the sleeve and the outwardly extending means for normally urging the sleeve in a direction toward the working tip;
the first slot in the guide being operative to hold the sleeve in an operative position relative to the tip with the outwardly extending means engaged therein, the second slot in the guide being operative to permit removal of the sleeve from the shank with the outwardly extending means engaged therein, and the ridged shoulder portion of the guide being operative to hold the sleeve in a retracted position with the working tip extending outside of the sleeve whenever the outwardly extending means is engaged therewith.

2. The invention as defined in claim 1 above, wherein the guide includes a raised annular portion at the outer surface thereof, and the inner wall of the sleeve includes means defining an annular recess for matingly receiving the raised annular portion of the guide.

3. The invention as defined in claim 1 above, wherein the sleeve and the guide are made of plastic.

4. The invention as defined in claim 1 above, wherein the outwardly extending means comprises an earlike element upset from the shank by forging.

5. The invention as defined in claim 1 above, wherein the outwardly extending means comprises an earlike element bonded to the outer surface of the shank.

6. The invention as defined in claim 1 above, further including a hollow cylindrical retainer slidably concentrically mounted between the coil spring and the shank and having a radially outwardly extending lip at one end thereof disposed between the outwardly extending means and the coil spring.

7. A centering sleeve assembly comprising the combination of:
- a hollow, generally cylindrical sleeve having an inner wall with an annular shoulder, said wall being flared outwardly at one end of the sleeve to receive the head of a workpiece and having an inwardly extending portion at the other end of the sleeve;
- means defining a first groove in the inside of the sleeve, the first groove extending along a portion of the sleeve;
- means defining a second groove in the inside of the sleeve, the second groove extending along a portion of the sleeve and terminating at the end of the sleeve opposite said one end; and
- a coil spring slidably concentrically mounted completely within the sleeve and having one end thereof engaging the annular shoulder.

8. The invention as defined in claim 7 above, further including a hollow cylindrical retainer slidably concentrically mounted within the coil spring and having a radially outwardly extending lip at one end thereof disposed adjacent the end of the coil spring opposite the annular shoulder.

9. The invention as defined in claim 7 above, wherein the sleeve includes a hollow, generally cylindrical guide concentrically mounted within the sleeve and having a first slot extending along a portion thereof and defining said first groove, a second slot extending along the entire length thereof and defining said second groove, and a ridged shoulder portion at one end thereof between the first and second slots.

10. The invention as defined in claim 1 above, wherein the sleeve has an inner wall which tapers uniformly outwardly at one end thereof to receive the head of a workpiece.

\* \* \* \* \*